US006664711B2

United States Patent
Baudendistel

(10) Patent No.: US 6,664,711 B2
(45) Date of Patent: Dec. 16, 2003

(54) HARMONIC MOTOR

(75) Inventor: Thomas A. Baudendistel, Farmersville, OH (US)

(73) Assignee: Delphi Technologies, Inc., Troy, MI (US)

( * ) Notice: Subject to any disclaimer, the term of this patent is extended or adjusted under 35 U.S.C. 154(b) by 14 days.

(21) Appl. No.: 09/938,223

(22) Filed: Aug. 23, 2001

(65) Prior Publication Data
US 2003/0038563 A1 Feb. 27, 2003

(51) Int. Cl.$^7$ ............................................. H01L 41/08
(52) U.S. Cl. ..................... 310/323.02; 310/82; 310/328
(58) Field of Search ........................... 310/328, 323.02, 310/82

(56) References Cited

U.S. PATENT DOCUMENTS

| 3,561,006 A | * | 2/1971 | Humphreys | 310/82 |
| 4,619,156 A |   | 10/1986 | Kiryu | 74/640 |
| 4,950,135 A | * | 8/1990 | Tojo et al. | 310/323.02 |
| 5,079,471 A |   | 1/1992 | Nygren, Jr. | 310/328 |
| 5,093,594 A |   | 3/1992 | Mehregany | 310/82 |
| 5,148,068 A | * | 9/1992 | Kushida et al. | 310/323.02 X |
| 5,237,234 A |   | 8/1993 | Jebens et al. | 310/309 |
| 5,378,948 A | * | 1/1995 | Richter | 310/328 |
| 5,854,528 A | * | 12/1998 | Nishikura et al. | 310/323.03 |
| 6,369,477 B1 | * | 4/2002 | Bonin | 310/82 |

FOREIGN PATENT DOCUMENTS

JP            0142979     *  6/1986  ............ 310/323.02

* cited by examiner

Primary Examiner—Mark Budd
(74) Attorney, Agent, or Firm—Scott A. McBain

(57) ABSTRACT

A harmonic motor includes a first annular member, a second member, and device for flexing the first annular member. The first annular member has a longitudinal axis and is flexible. The second member is substantially coaxially aligned with the first annular member. One of the first annular and second members is rotatable about the longitudinal axis, and the other of the first annular and second members is nonrotatable about the longitudinal axis. The flexing device flexes the first annular member into at least two spaced-apart points of contact with the second member and sequentially flexes the first annular member to rotate the at least two points of contact about the longitudinal axis which rotates the rotatable one of the first annular and second members about the longitudinal axis. The flexing device is nonrotatable about the longitudinal axis.

17 Claims, 2 Drawing Sheets

HARMONIC MOTOR

TECHNICAL FIELD

The present invention relates generally to motors, and more particularly to harmonic motors.

BACKGROUND OF THE INVENTION

Motors include harmonic motors. One type of harmonic motor has a rotatable rotor and a surrounding nonrotatable stator. The rotor makes a single point of contact with the inner circumference of the stator. The single point of contact rotates around (i.e., rolls around) the inner circumference of the stator. The rotor rotates a few degrees about its longitudinal axis for each complete rotation of the single point of contact about the inner circumference of the stator. In one modification, the outer circumference of the rotor and the inner circumference of the stator have gear teeth. Such motors find use in high torque, low speed motor applications. In one known variation, the rotatable rotor is above a nonrotatable stator, the rotatable rotor flexes or wobbles downward to make a single point of contact with the stator, the single point of contact rotates around an "inner circumference" of the stator, and the rotor rotates a few degrees about its longitudinal axis for each complete rotation of the single point of contract. In another type of harmonic motor, a shaft is surrounded by a shaft driving member which is brought into a single point of contact with the shaft by electro-restrictive devices, wherein the rotor rotates a few degrees for each complete rotation of the single point of contact around an inner circumference of the shaft driving member.

Harmonic drive gear trains are known. In one known design, a motor rotates a "wave generator" which is an egg-shaped member which flexes diametrically opposite portions of the surrounding flex-spline gear which is inside an outer gear. As the diametrically opposite teeth of the flex-spline gear contact the teeth on the outer gear, the rotatable one of the gears rotates with respect to the nonrotatable one of the gears.

What is needed is a new type of harmonic motor which uses at least two points of contact to rotate the rotor.

SUMMARY OF THE INVENTION

In a first expression of the invention, a harmonic motor includes a first annular member, a second member, and a device for flexing the first annular member. The first annular member has a longitudinal axis, lies in a plane perpendicular to the longitudinal axis, and is flexible along a direction which lies in the plane. The second member is substantially coaxially aligned with the first annular member and lies in the plane. One of the first annular and second members is rotatable about the longitudinal axis, and the other of the first annular and second members is nonrotatable about the longitudinal axis. The flexing device flexes the first annular member into at least two spaced-apart points of contact with the second member and sequentially flexes the first annular member to rotate the at least two points of contact about the longitudinal axis which rotates the rotatable one of the first annular and second members about the longitudinal axis. The flexing device is nonrotatable about the longitudinal axis.

Several benefits and advantages are derived from the first expression of the invention. By using at least two points of contact between the first annular and second members, the rotatable one (i.e., the rotor) of the first annular and second members is being driven by at least two points of contact by the nonrotatable one (i.e., the rotor driving member) of the first annular and second members. Driving the motor with at least two points of contact provides a more robust and more smoothly operating motor than is provided by the prior art, as can be appreciated by the artisan.

DESCRIPTION OF THE PREFERRED EMBODIMENTS

Figure 1:
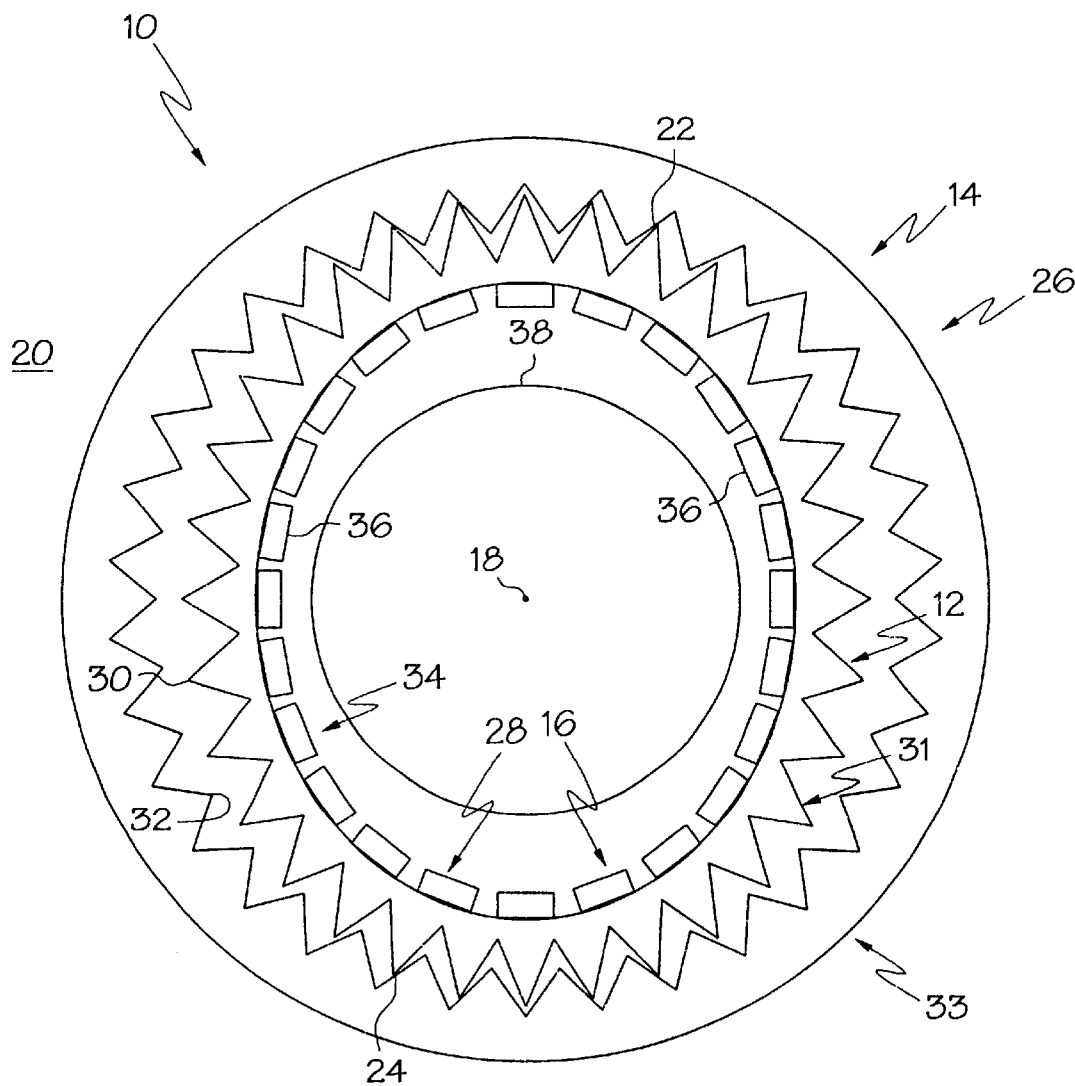
FIG. 1 is a schematic diagram of a first embodiment of the harmonic motor of the invention, wherein an array of magnets is used to flex a flex-spline gear of the harmonic motor.

Referring now to the drawings, FIG. 1 illustrates a first embodiment of the harmonic motor 10 of the present invention. In a first expression of the first embodiment shown in FIG. 1, the harmonic motor 10 includes a first annular member 12, a second member 14, and means 16 for flexing the first annular member 12. The first annular member 12 has a longitudinal axis 18 (seen as a point in FIG. 1). The first annular member lies in a plane 20 (the plane of the paper as seen in FIG. 1) perpendicular to the longitudinal axis 18. The first annular member 12 is flexible along a direction which lies in the plane 20. The second member 14 is substantially coaxially aligned with the first annular member 12 and lies in the plane 20. One of the first annular and second members 12 and 14 is rotatable about the longitudinal axis 18, and the other of the first annular and second members 12 and 14 is nonrotatable about the longitudinal axis 18. The flexing means 16 is means for flexing the first annular member 12 into at least two spaced-apart points of contact 22 and 24 with the second member 14 and for sequentially flexing the first annular member 12 to rotate the at least two points of contact 22 and 24 about the longitudinal axis 18 which rotates the rotatable one of the first annular and second members 12 and 14 about the longitudinal axis 18. The terminology "two spaced-apart points of contact" means two points of contact which are not part of the same contiguous area of contact. The flexing means 16 is nonrotatable about the longitudinal axis 18.

In one example, the second member 14 is a second annular member 26 and the first annular member 12 is disposed inside the second member 14. In another example, not shown, the second member 14 is annular or not and the first annular member is disposed outside the second member. In one modification of any of the examples, the first annular member 12 is rotatable and the second member 14 is nonrotatable. In another example, not shown, the first annular member is nonrotatable and the second member is rotatable. In one design of any of the examples and modifications, the shape of the flexed first annular member 12 is substantially egg-shaped having two points of contact 22 and 24. In another designs, not shown, the shape of the flexed first annular member is arbitrary and includes a triangular shape having three points of contact, a square shape having four diagonal-end points of contact, etc.

In a second expression of the first embodiment of the invention shown in FIG. 1, a harmonic motor 10 includes a first annular member 12, a second annular member 26, and means 28 for flexing the first annular member 12. The first annular member 12 has a longitudinal axis 18, and the first annular member 12 is nonrotatable about the longitudinal axis 18. The first annular member 12 lies in a plane 20 perpendicular to the longitudinal axis 18, and the first annular member 12 is flexible along a direction which lies in the plane 20. The second annular member 26 is substantially coaxially aligned with the first annular member 12 and lies in the plane 20. The second annular member 26 is rotatable about the longitudinal axis 18. The flexing means 28 is means for flexing the first annular member 12 into at least two spaced-apart points of contact 22 and 24 with the second annular member 26 and for sequentially flexing the first annular member 12 to rotate the at least two points of contact 22 and 24 about the longitudinal axis 18 which rotates the second annular member 26 about the longitudinal axis 18.

In one example, the first annular member 12 has an unflexed substantially circular shape, and the second annular member 26 has a substantially circular shape. In one design, the first annular member 12 is disposed circumferentially within the second annular member 26. In one modification, the first annular member 12 has first gear teeth 30 on its outer circumference, and the second annular member 26 has second gear teeth 32 on its inner circumference. In another modification, not shown, there are no gear teeth. In one variation, the first annular member 12 is a harmonic-gear-train flex-spline gear 31, and the second annular member 26 is a harmonic-gear-train outer gear 33. The number of gear teeth 30 of the spline gear 31 is less than (such as at least two less than) the number of gear teeth 32 of the outer gear 33. In one application, the flexing means 16 and 28 is means for flexing the flex-spline gear 31 into two substantially diametrically opposite points of contact 22 and 24 with the outer gear 33 and for sequentially flexing the flex-spline gear 31 to rotate the at least two points of contact 22 and 24 about the longitudinal axis 18 which rotates the outer gear 33 about the longitudinal axis 18, wherein the flexing means 16 and 28 is nonrotatable about the longitudinal axis 18.

In one example, the flexing means 16 and 28 includes an array 34 of spaced apart magnets 36 disposed on the inner perimeter or the inner circumference of the first annular member 12 and a magnetic stator 38 disposed inside and spaced apart from the array 34. In one implementation, the nonrotating magnetic stator 38 is operable to generate a rotating magnetic field to repel substantially diametrically opposed ones of the nonrotating magnets 36. In one application, the magnetic stator 38 is operable to magnetically repel substantially diametrically opposite ones of the magnets 36 of the array 34 in a circumferentially sequential manner to create at least two substantially diametrically opposite rotating points of contact 22 and 24 of the flex-spline gear 31 with the outer gear 33 which rotates the outer gear 33 about the longitudinal axis 18.

Figure 2:
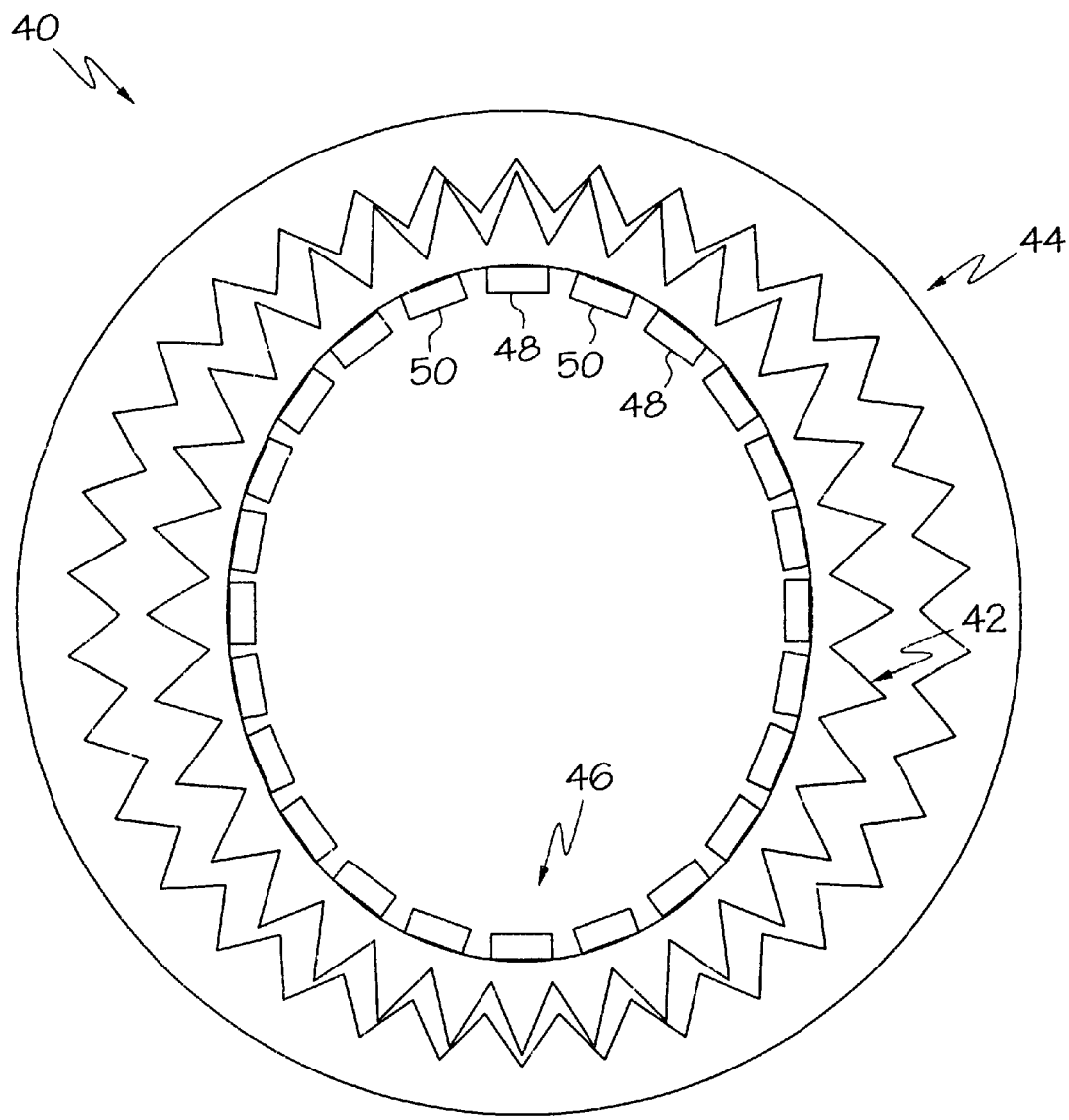
FIG. 2 is a schematic diagram of a second embodiment of the harmonic motor of the invention, wherein an array of expanding and contracting members is used to flex a flex-spline gear of the harmonic motor.

A second embodiment of the harmonic motor 40 of the invention is shown in FIG. 2. The harmonic motor 40 includes a first annular member 42, a second annular member 44, and means 46 for flexing the first annular member 42. The first annular member 42 is substantially identical to the first annular member 12 of the first embodiment, the second annular member 44 is substantially identical to the second annular member 26 of the first embodiment, and the flexing means 46 performs the same function as the flexing means 16 and 28 of the first embodiment. In one example, shown in FIG. 2, the flexing means 46 includes an array of spaced apart, piezoelectric members 48 disposed on the inner perimeter or the inner circumference of the first annular member 42. In another example, also shown in FIG. 2, the flexing means 42 includes an array of spaced apart, magneto-restrictive members 50 disposed on the inner perimeter or the inner circumference of the first annular member 42. In one application, the flexing means 42 is operable to radially expand substantially diametrically opposite portions of the flex-spline gear 31 in a circumferentially sequential manner to create at least two substantially diametrically opposite rotating points of contact of the flex-spline gear 31 with the outer gear 33 to rotate the outer gear 33 about the longitudinal axis 18. In one variation, the flexing means includes piezoelectric members but not magneto-restrictive members, and in another variation, the flexing means includes magneto-restrictive members but not piezoelectric members. In an additional example, not shown, the flexing means includes an electro polymer actuator (EPA). In other examples, not shown, the flexing means includes hydraulic, pneumatic, and/or solenoid actuators which move substantially diametrically opposite plungers, of a non-rotating spoke array of plungers, in a circumferentially sequential manner.

It is noted that in applicable embodiments and expressions of the invention, the flexing means flexes an inner first annular member outward into at least two points of contact with a surrounding outer second annular member or flexes an outer first annular member inward into at least two points of contact with a surrounded inner second member. In one variation, between sequential flexing, the first annular member itself unflexes without assistance, and in another variation, the first means unflexes (or helps to unflex) the first annular member, as can be accomplished by the artisan.

Several benefits and advantages are derived from the first expression of the invention. By using at least two points of contact between the first annular and second members, the rotatable one (i.e., the rotor) of the first annular and second members is being driven by at least two points of contact by the nonrotatable one (i.e., the rotor driving member) of the first annular and second members. Driving the motor with at least two points of contact provides a more robust and more smoothly operating motor than is provided by the prior art, as can be appreciated by the artisan.

The foregoing description of several expressions and embodiments of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A harmonic motor comprising:
   a) a first annular member having a longitudinal axis, wherein the first annular member lies in a plane perpendicular to the longitudinal axis, and wherein the first annular member is flexible along a direction which lies in the plane;
   b) a second member substantially coaxially aligned with the first annular member and lying in the plane, wherein one of the first annular and second members is rotatable about the longitudinal axis, and wherein the other of the first annular and second members is nonrotatable about the longitudinal axis; and
   c) means for flexing the first annular member into at least two spaced-apart points of contact with the second member and for sequentially flexing the first annular member to rotate the at least two points of contact about the longitudinal axis which rotates the rotatable one of the first annular and second members about the longitudinal axis, wherein the flexing means is nonrotatable about the longitudinal axis and wherein each part of the flexing means which at any time contacts the first annular member is attached at all times to the first annular member.

2. A harmonic motor comprising:
a) a first annular member having a longitudinal axis, wherein the first annular member is nonrotatable about the longitudinal axis and lies in a plane perpendicular to the longitudinal axis, and wherein the first annular member is flexible along a direction which lies in the plane;
b) a second annular member substantially coaxially aligned with the first annular member and lying in the plane, wherein the second annular member is rotatable about the longitudinal axis; and
c) means for flexing the first annular member into at least two spaced-apart points of contact with the second annular member and for sequentially flexing the first annular member to rotate the at least two points of contact about the longitudinal axis which rotates the second annular member about the longitudinal axis, wherein the flexing means is nonrotatable about the longitudinal axis and wherein each part of the flexing means which at any time contacts the first annular member is attached at all times to the first annular member.

3. The harmonic motor of claim 2, wherein the first annular member has an unflexed substantially circular shape, and wherein the second annular member has a substantially circular shape.

4. The harmonic motor of claim 3, wherein the first annular member is disposed circumferentially within the second annular member.

5. The harmonic motor of claim 4, wherein the first annular member has first gear teeth on its outer circumference, and wherein the second annular member has second gear teeth on its inner circumference.

6. The harmonic motor of claim 5, wherein the first annular member is a harmonic-gear-train flex-spline gear, and wherein the second annular member is a harmonic-gear-train outer gear.

7. The harmonic motor of claim 6, wherein the flexing means includes an array of spaced apart magnets disposed on the inner circumference of the flex-spline gear and a magnetic stator disposed inside and spaced apart from the array.

8. The harmonic motor of claim 6, wherein the flexing means includes an array of spaced-apart, piezoelectric members disposed on the inner circumference of the flex-spline gear.

9. The harmonic motor of claim 6, wherein the flexing means includes an array of spaced apart, magneto-restrictive members disposed on the inner circumference of the flex-spline gear.

10. The harmonic motor of claim 2, wherein the flexing means includes an array of spaced apart magnets disposed on the inner perimeter of the first annular member and a magnetic stator disposed inside and spaced apart from the array.

11. The harmonic motor of claim 2, wherein the flexing means includes an array of spaced-apart, piezoelectric members disposed on the inner perimeter of the first annular member.

12. The harmonic motor of claim 2, wherein the flexing means includes an array of spaced apart, magneto-restrictive members disposed on the inner perimeter of the first annular member.

13. A harmonic motor comprising:
a) a harmonic-gear-train outer gear having a longitudinal axis;
b) a harmonic-gear-train flex-spline gear having an inner circumference and disposed inside the outer gear, wherein one of the outer and flex-spline gears is rotatable about the longitudinal axis, and wherein the other of the outer and flex-spline gears is nonrotatable about the longitudinal axis; and
c) means for flexing the flex-spline gear into two substantially diametrically opposite points of contact with the outer gear and for sequentially flexing the flex-spline gear to rotate the at least two points of contact about the longitudinal axis which rotates the rotatable one of the outer and flex-spline gears about the longitudinal axis, wherein the flexing means is nonrotatable about the longitudinal axis and wherein each part of the flexing means which at any time contacts the flex-spline gear is attached at all times to the flex-spline gear.

14. A harmonic motor comprising:
a) a harmonic-gear-train outer gear rotatable about a longitudinal axis;
b) a harmonic-gear-train flex-spline gear having an inner circumference, disposed inside the outer gear, and nonrotatable about the longitudinal axis; and
c) means for flexing the flex-spline gear into two substantially diametrically opposite points of contact with the outer gear and for sequentially flexing the flex-spline gear to rotate the at least two points of contact about the longitudinal axis which rotates the outer gear about the longitudinal axis in a direction opposite the direction of rotation of the at least two points of contact, wherein the flexing means is nonrotatable about the longitudinal axis and wherein each part of the flexing means which at any time contacts the flex-spline gear is attached at all times to the flex-spline gear.

15. A harmonic motor comprising:
a) a harmonic-gear-train outer gear rotatable about a longitudinal axis;
b) a harmonic-gear-train flex-spline gear having an inner circumference, disposed inside the outer gear, and nonrotatable about the longitudinal axis;
c) an array of spaced apart magnets disposed on the inner circumference of the flex-spline gear, wherein each of the magnets which at any time is disposed on the inner circumference of the flex-spline gear is disposed at all times on the inner circumference of the flex-spline gear, and wherein all magnets which at any time are disposed on the inner circumference of the flex-spline gear are spaced apart from each other; and
d) a nonrotatable magnetic stator disposed inside and spaced apart from the array, wherein the magnetic stator is operable to magnetically repel and attract substantially diametrically opposite ones of the magnets of the array in a circumferentially sequential manner to create at least two substantially diametrically opposite rotating points of contact of the flex-spline gear with the outer gear to rotate the outer gear about the longitudinal axis.

16. A harmonic motor comprising:
a) a harmonic-gear-train outer gear rotatable about a longitudinal axis;
b) a harmonic-gear-train flex-spline gear having an inner circumference, disposed inside the outer gear, and nonrotatable about the longitudinal axis; and c) an array of spaced apart, piezoelectric members disposed on the inner circumference of the flex-spline gear and operable to radially expand and contract substantially diametrically opposite portions of the flex-spline gear in a circumferentially sequential manner to create at least two substantially diametrically opposite rotating points of contact of the flex-spline gear with the outer gear to rotate the outer gear about the longitudinal axis, wherein each of the piezoelectric members which at any time is disposed on the inner circumference of the flex-spline gear is disposed at all times on the inner circumference of the flex-spline gear, and wherein all piezoelectric members which at any time are disposed on the inner circumference of the flex-spline gear are spaced apart from each other.

17. A harmonic motor comprising:

a) a harmonic-gear-train outer gear rotatable about a longitudinal axis;

b) a harmonic-gear-train flex-spline gear having an inner circumference, disposed inside the outer gear, and nonrotatable about the longitudinal axis; and c) an array of spaced apart, magneto-restrictive members disposed on the inner circumference of the flex-spline gear and operable to radially expand and contract substantially diametrically opposite portions of the flex-spline gear in a circumferentially sequential manner to create at least two substantially diametrically opposite rotating points of contact of the flex-spline gear with the outer gear to rotate the outer gear about the longitudinal axis, wherein each of the magneto-restrictive members which at any time is disposed on the inner circumference of the flex-spline gear is disposed at all times on the inner circumference of the flex-spline gear, and wherein all magneto-restrictive members which at any time are disposed on the inner circumference of the flex-spline gear are spaced apart from each other.

* * * * *